Feb. 16, 1937.　　　C. R. MEISSNER　　　2,070,671
REPEATER TESTING
Filed Oct. 4, 1933　　　2 Sheets-Sheet 1
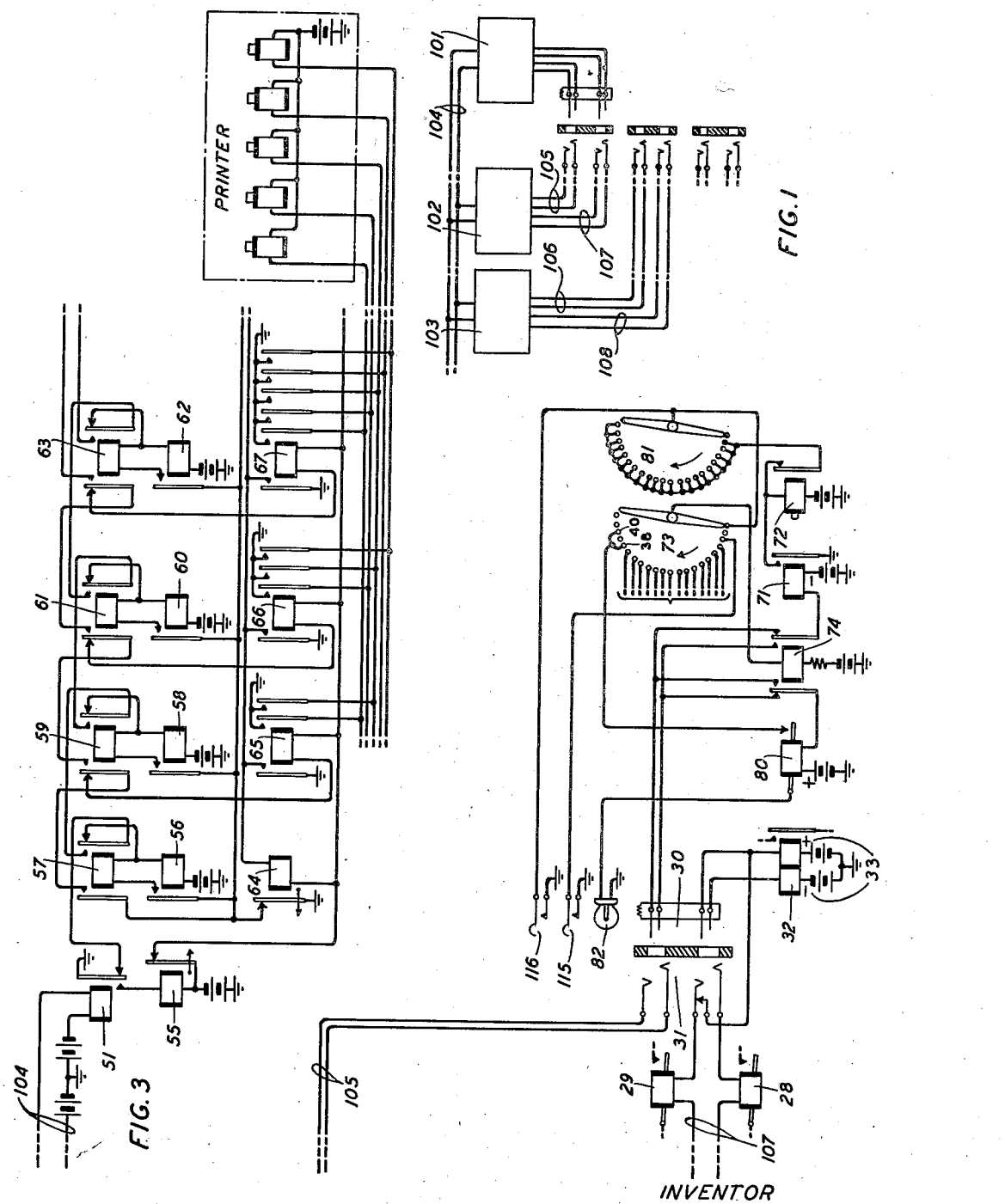
INVENTOR
C. R. MEISSNER
BY J. A. Burgess
ATTORNEY Feb. 16, 1937.    C. R. MEISSNER    2,070,671
REPEATER TESTING
Filed Oct. 4, 1933    2 Sheets-Sheet 2
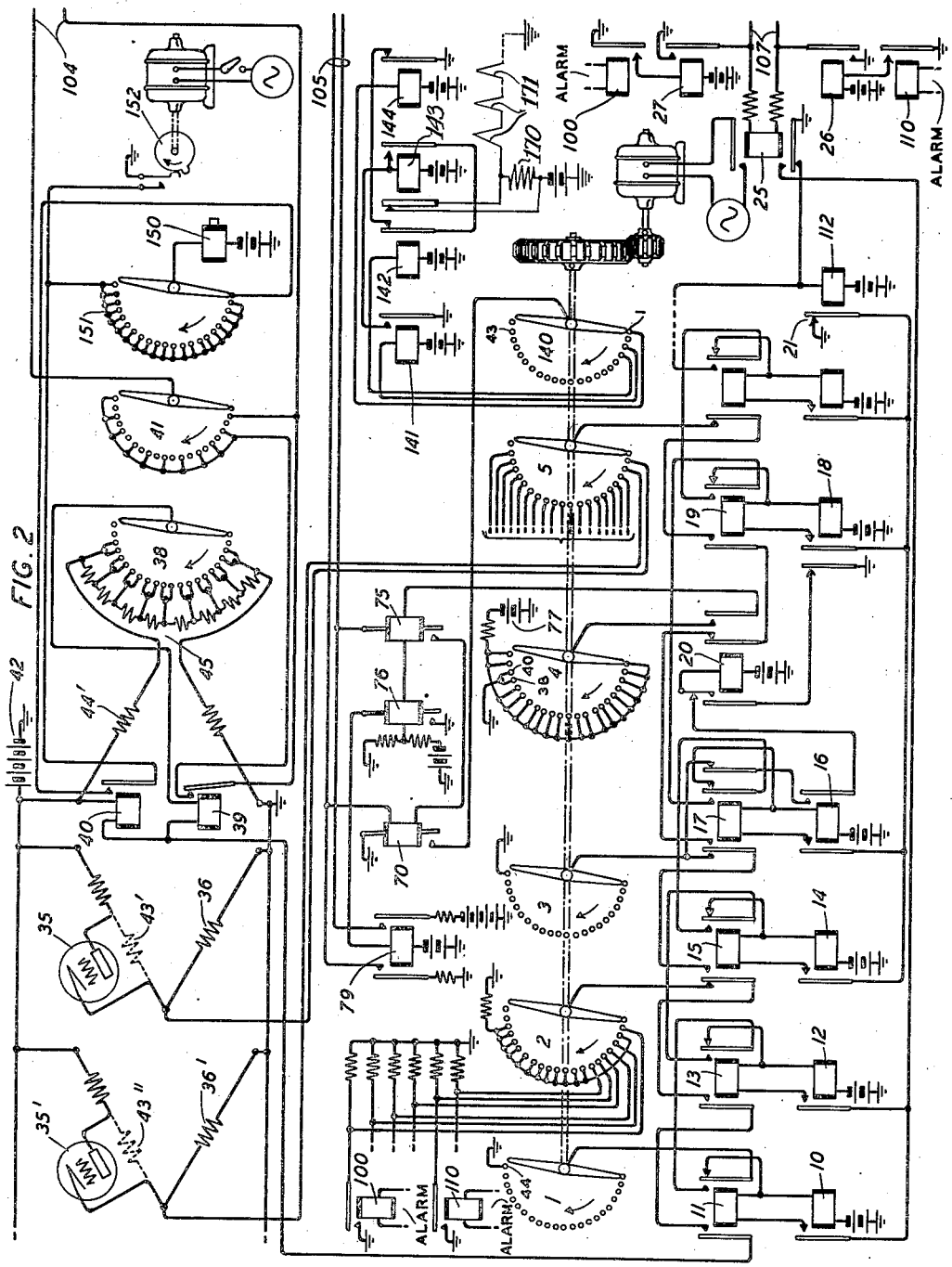
INVENTOR
C. R. MEISSNER
BY
H. A. Burgess
ATTORNEY Patented Feb. 16, 1937

2,070,671

UNITED STATES PATENT OFFICE 2,070,671

REPEATER TESTING

Charles R. Meissner, Chatham, N. J., assignor to Bell Telephone Laboratories, Incorporated, New York, N. Y., a corporation of New York Application October 4, 1933, Serial No. 692,171

6 Claims. (Cl. 179—175.31)

The present invention relates to remote indication and remote control and is especially adapted to the use of outlying unattended repeater or other stations on a signaling system.

In carrier telephony on lines as the operating frequency range extends to higher levels, the attenuation that is encountered also increases and necessitates closer repeater spacing. In concentric line conductor or carrier-on-cable systems, for example, the repeater spacing may be 25 miles or even much lower, spacings of less than 10 miles being considered practicable in some cases.

The cost of maintaining personal attendance at so many repeater stations at all times would be prohibitive. It has been proposed to place these repeater stations in small enclosures, for example, in manholes or small huts, and to have them visited by an attendant for inspection or replacements, etc. at intervals of perhaps weeks or months. Meantime, it is desirable to be able to make tests, of the repeater apparatus from a remote point such as a main attended repeater or terminal station.

It is especially important in the case of a multiplex carrier repeater to avoid tube or other apparatus failure since a single repeater may be common to a large number of channels, say 50 or 100 channels, and a repeater failure means the interruption of a corresponding number of talking circuits.

Repeater circuits have been perfected which operate under varying conditions of voltage or power supply, filament emission, amplification factor, etc. and still remain highly stable, as disclosed in an application of H. S. Black, Serial No. 606,871, filed April 22, 1932. By using tubes of long filament life in such repeaters, the liability of unsatisfactory operation may be kept small.

The present invention is concerned among other things with a type of testing which is aimed at anticipating tube or apparatus failure. Routine tests are made by remote testing automatic recording circuits and records are kept at the test station and are carefully compared. If, for example, the emissivity of a cathode of a repeater tube shows a decrease over a period of time, such tube is replaced instead of waiting for it to fail in service. In this way incipient failures may be detected and actual failures prevented.

Spare repeaters may be provided and arranged to be switched into a circuit to replace a repeater which may have suddenly failed or whose operation may have fallen to an unsatisfactory grade. This and other functions are performed, in accordance with this invention, by remote switching.

The invention also provides for the sending of alarm signals to the remote test station. As was stated, the unattended repeaters will in some cases be housed in a small space. Power to the extent of several kilowatts is dissipated in these repeaters. If cooling or ventilating equipment fails, the temperature may rise to too high values, and a thermostat closes contact to send an alarm signal to the test station. Fire may break out, a fuse may blow out, or any one of a large number of emergency conditions occur. The invention provides for notifying the test station of all of these conditions.

With these general objects and features in view, the invention will be more fully understood from the following detailed description of a preferred embodiment. In the drawings forming a part of this specification, Fig. 1 shows in schematic form the general plan of the test station in relation to the outlying repeaters and circuits interconnecting them; and Figs. 2 and 3 when placed side by side with Fig. 2 at the left show a schematic circuit diagram of the test station and one distant repeater station.

Referring first to Fig. 1, it is assumed that the main or test station 101 and the outlying repeater stations 102 and 103 are stations common to a large number of lines, for example, the lines included in one or more telephone cables. The lines which are used for multiplex carrier transmission have repeaters in them at these stations 101, 102 and 103 as well as at other similar stations not shown. In order to simplify the disclosure, the present specification shows only the test and control circuits that are used to accomplish the objects of the invention and the multiplex carrier circuits themselves are not illustrated. Certain of the circuits within the cable are set aside for use by the testing and control circuits of the invention, such as line 104 which is common to a number of repeater stations and is used as a pulsing loop, and lines 105 and 106, one from each remote repeater station, used for switch control, and lines 107 and 108 used as control circuits, one to each remote station.

The test station has apparatus (shown in detail in Fig. 3) which is used in common for test and control by all of the remote repeater stations. When it is desired to test a remote station, a double plug is inserted into the line jacks of the corresponding station, such as lines 104, 105 and 107 for station 102, and the complete series of testing, controlling and switching can be carried out for that station. The indications are sent back over pulsing circuit 104 to the test station.

Referring briefly to the series of operations involved in a repeater test, rotating switches, shown at 1, 2, 3, 4, 5 and 140 in Fig. 2, at the repeater are started into operation and determine the sequence of the operations.

The arms of these switches are continuously driven in a clockwise direction by the motor and gearing shown at the right-hand end of the shaft on which the switch arms are mounted. While all the switch arms revolve in unison, only one switch sector is effective at a time. This effect is secured by the aid of a bank of counting relays 10 to 112 shown just below the switches. These relays are operated in pairs in sequence as is common in telephone switching practice, and in operating they make operative or inoperative the leads extending to respective switch arms to enable the different switches to perform their respective functions in sequence. The impulses which control the stepping of the counting relays come from switch sector No. 1, there being one stepping impulse sent into the chain of counting relays for each revolution of the arm of this switch. The series of switches 1, 2, 3, etc., and the counting relays 10, 11, 12, 13, etc., cooperate, therefore, to enable the three main functions of (1) alarm testing and sending, (2) remote switching and (3) tube testing to be carried out in sequence at a given repeater station and the indications sent to the main or control station.

With the particular organization of circuits and apparatus to be described more fully hereinafter, these three main functions are carried out in the following general manner, specific description being given further on.

First, a survey is made of all of the alarm circuits at the repeater. For example, an alarm condition is reported to the test station regardless of whether the testing equipment is plugged into the line leading to the station where such alarm condition exists or not. This alarm signal if received when the test apparatus is not connected to the repeater identifies the repeater but does not give the nature of the alarm condition. By connecting the test apparatus to the repeater station in question, the rotating switch mechanism searches out the particular emergency condition which caused the alarm signal to be sent and identifies that condition.

After the completion of the alarm testing cycle, there is a standby interval to allow for the interpretation of any alarm signals that have been sent and to determine what operations should be performed in accordance with such alarm indications. Then follows a switching cycle during which the attendant at the test station can perform switching operations at the remote repeater station such as replacing repeaters, etc.

After this follows a tube testing cycle in which all of the vacuum tubes in the repeater station are tested for cathode emissivity or other characteristics, in succession as will be more fully described. By an extension of the principles employed still other functions could, of course, be performed, those specifically disclosed being illustrative.

The general arrangement of the switches 1, 2, 3, etc., and the counting relays 10, 11, 12, 13, etc., has been already described. The repeater tubes to be tested (of which there may be a large number in each repeater station) are represented in the upper part of Fig. 2 by the two tubes 35 and 35'. A Wheatstone bridge shown at 36, 43', 44' and 45 is used in making the actual tube tests, and this bridge has in its galvanometer diagonal a polar relay 39 which releases or attracts its armature for a condition of bridge unbalance in one or the other direction. For economy of apparatus relay 39 also cooperates in the sending of the alarm signals in a manner to be described.

In order to send indications of tube tests and identifications of alarms to the remote control station (Fig. 3) over conductors 104, a stepping switch with sectors 38, 41 and 151 is driven by motor magnet 150 and the sending of the impulses is under control of galvanometer relay 39 in cooperation with switch sector 41. The starting of the switches 38, 41 and 151 is under control of starting cam 152 which is driven by either the same motor as that which drives the switches 1, 2, 3, etc., or by a motor whose speed is properly related thereto. In the normal use of the bridge, that is, for tube testing, the galvanometer relay 39 cooperates, in a manner to be described, with pulsing switches 38 and 41 to send a number of pulses to the test station to give a measure of bridge unbalance. These same elements are used to send alarms by connecting the relay 39 so that a complete series of, say, ten impulses is sent.

For the purpose of performing remote switching at the repeater station from the control station of Fig. 3, stepping switches 73 and 81 are provided at the latter station, adapted to be driven at the same rate as the continuously driven switches 1, 2, 3, etc., at the repeater station, Fig. 2, in a manner to be described under the heading "Remote switching circuit". Keys 115, 116, etc., are provided at the control station to enable an attendant to perform selective switching operations at the distant station over the loop 105.

The apparatus and functions that have been described in outline above will now be made more clear by following through the cycle of operations in detail.

When the attendant at the test station desires to connect with an unattended repeater station for the purpose of making tests, transmitting switching impulses thereto, etc., he inserts double plug 30 into jack 31. Current from battery 33 flows through windings of pilot relay 32 energizing that relay and over the control loop 107 operating relay 25 which starts the motor mechanism at the unattended station into operation driving the various rotary switches 1, 2, 3, 4, 5, etc. of that station which are all mounted on the same shaft and driven by the same motor. Pilot relay 32 may be used to identify the repeater station that is under test.

Sector No. 1 is the control sector and through the counting relay chain it determines the order in which the various functions of alarm, switching, tube measurements, etc. are to be carried out. When the brush on the control sector passes contact 44 which is grounded, relay 10 is energized over back contact of relay 11, and after the circuit is broken at 44, relay 11 pulls up and locks over the front contact of 10. This transfers the galvanometer lead from galvanometer relay 39 to the armature of the second pair of counting relays 12, 13. After one more complete rotation of the control sector which occupies about three minutes, another ground impulse is transmitted from the brush to the winding of relay 12. When relay 13 energizes after the brush leaves contact 44 the galvanometer lead is transferred through back contact of relay 15 to the brush of the alarm sector 2.

The contacts of the alarm sector 2 are controlled in accordance with any number and type of alarm conditions to connect it either through a high resistance or through a low resistance to ground. For example, there may be at the unattended station a number of relays, such as relay 100, indicating that a fuse has blown out or that a fire has broken out or that the temperature is too high or that some other abnormal condition prevails. When such alarm conditions exist the corresponding contact is connected directly to ground. When the brush arm sweeps over such contact the galvanometer relay 39 and pulsing switch control relay 40' in the bridge circuit operate and send a full series of impulses from brush arm 41 over the pulsing loop causing a corresponding number of pulsations of relay 51 at the test station. The effect of these impulses and the details of the circuit by which they are sent will be described later on. If the alarm relay such as 100 is not energized, the switch arm connects to a high resistance in the ground lead and this resistance prevents the energization of relays 39 and 40' so that no alarm identification for that contact can be sent out.

After one complete revolution of the arm of switch 2 all of the alarm conditions have been transmitted. At this time the brush arm of the control sector 1 has again made contact with 44 and energized relay 14 after which relay 15 pulls up transferring the control lead to winding of relay 16.

Sector No. 3 is a marking time sector for the purpose of introducing a three-minute interval between the transmission of the alarm indications (if any) by sector 2 and the bringing into play of the switching sector 4 so that the attendant at the distant station will have time to consider what kind of switching operations he desires to make. After another complete rotation of the switches, the brush arm of control sector 1 connects ground at 44 to the control wire and energizes relay 16. At this same time cut-off relay 20 energizes from grounded contact 44 of mark time switch 3 over front contact of relay 16. Upon breaking of the control circuit, relay 17 then energizes which would, as before, transfer the galvanometer contact to the next pair of counting relays except for the fact that this circuit is broken at the back contact of relay 20. The galvanometer lead is thus kept open. The front contact of relay 20 connects the brush arm of the switching control sector 4 to the polarized relays 75 and 76, so that during the next rotation of the switches, the various switch control impulses can be sent from the test station to the unattended station. The manner in which these switch controlling impulses are sent will be described later.

After the completion of the switch controlling cycle, that is, after one more complete rotation of the switches, the control sector 1 by grounding the control circuit energizes relay 18 thus releasing cut-off relay 20 which up to this time has been locked up over the back contact of relay 18. When relay 20 releases, the galvanometer lead is then transferred through its back contact to the armature of relay 19. After the subsequent breaking of the control lead relay 19 energizes thus transferring the galvanometer lead to the brush arm of the tube testing switch 5. The details of carrying out the tube testing will be described at a later point.

After the completion of the tube testing cycle by sector 5, still other sectors may be brought into the circuit by counting relays not specifically shown but indicated by the broken lead in the counting relay chain. Thus as control sector 1 completes its rotation and grounds the control lead, another pair of counting relays acting similarly to 18 and 19 transfer the galvanometer relay lead to the arm of another switch sector like 5 to test forty-four additional tubes, assuming the switch is a 44-point switch. When all of the counting relay chains have been gone through, release relay 112 energizes from the next ground on the control lead and restores the counting relays from and including the pair 14—15 onward. By a transfer switch not specifically shown, these restored relays can be used over again to co-operate, exactly as has been described, with switch control sectors like 4 and tube testing sections like 5 to perform as large number of switching and testing operations as may be desired at any station, without too great a multiplication of the counting relays necessary. Counting relay pairs 10, 11 and 12, 13 remain operated under control of starting relay 25, since it is assumed that all of the alarm tests necessary at the one station have been made.

The operation of the counting relays and switch sectors to determine the sequence of operations having now been given, the operations of the apparatus associated with them will now be outlined.

*Alarm circuit*

The existence of an alarm condition at the unattended repeater sends an alarm indication to the test station regardless of whether the attendant there is testing the particular station or not. For example, by a circuit not specifically shown, certain of the alarm relays such as relay 100 which are connected to the alarm sector 2 to vary the resistance connected to the various terminals of that sector also have their armature contacts multipled to master alarm relay 27 so that this relay pulls up and grounds the upper side of the control loop causing operation of relay 29 at the test station. The operation of this relay merely informs the operator that there is an alarm condition at a particular unattended repeater station, but it does not give any information as to the nature of the alarm condition. In order to determine the latter, the attendant must plug his apparatus into jack 31 and set the rotary switch at the repeater station into operation.

However, by multiplying the contacts of a few of the special emergency alarm relays, such as relay 110 to master alarm relay 26, the fact that a special emergency exists can be indicated immediately. For example, relay 26 grounds the lower side of the control loop causing operation of relay 28 at the test station which may be used to give a special alarm. Relays of the group to which 110 belong may show that a fire has broken out or a ventilating system has ceased operating, requiring immediate switching in of a fire extinguishing apparatus or auxiliary ventilating apparatus.

*Remote switching circuit*

In order to accomplish switching operations at the repeater station, the apparatus connected to the switching loop 105 is used. The switching control arc 4 and switching function arc 140 are both driven from the motor mechanism at the repeater station at a constant rate as already described. When the brush of sector 4 passes over its contacts, current from battery 77 operates relay 75 but not relay 76. Operation of relay 75 closes the switching loop and causes operation of relay 71 at the test station which in turn energizes stepping magnet 72 to step the switches 73 and 81 around. (Polarized relays 70 and 80 are in this series circuit but cannot operate in response to these impulses.) In other words, switch 73 follows by a succession of steps the steady movements of switch 4.

In order to perform switching operations, the attendant closes any one of the keys or, if desired, a number of the keys 115, connected to contacts of switch 73 thus grounding the corresponding stationary contacts of the switch. When the non-bridging switch arm passes over the corresponding contact, relay 74 is energized reversing the connections of the switching loop thus sending battery current over the loop in opposite direction from normal. A reverse impulse of this sort causes relay 70 to operate and place ground on switch arm of switch 140 which at the same angular position as switch arm of 73 at the distant test station closes circuit for the corresponding switch relay 141 or 142 at the repeater station. These relays are associated and paired, one for performing a certain switching operation and the other for doing the opposite. For example, switch 141 operates switch magnet 143 which locks up over back contact of relay 142. If then relay 142 is operated the switch magnet 143 is released and the function is restored. All of the operating magnets are multipled to the master switch magnet 144 at its back contact so that upon operation of this one master switch magnet all of the switching operations that have been performed during a cycle can be restored. Relay 143 is shown with one of its armatures normally shunting a resistance 170 serially included in the heating circuit for the cathodes of a number (such as all) of the repeaters at the station, these being indicated as filaments 171. By operating relay 143 in the manner that has been described, resistance 170 may be effectively inserted into the cathode-heating circuit to reduce the heating current by a predetermined amount. This resistance remains effectively in the heating circuit as long as relay 143 remains locked up which is for any length of time that the attendant at the test station may desire.

When the brush arm of switch 4 passes over the grounded contacts 38 and 40 ground instead of battery is placed on the switch contacts causing polarized relay 76 to operate in place of relay 75. This in turn operates relay 79 and applies 220-volt battery in reverse direction over the switching loop causing operation of relay 80 at the test station. If at the corresponding instance of time the brush arm of switch 73 is passing over corresponding contacts 38 and 40, the lamp 82 is lighted over a circuit including front contact of relay 80, brush arm and stationary contact, winding of relay 74, battery to ground, the current for the lamp being insufficient to operate relay 74. If the switches are in exact synchronism there will be two flashes of lamp 82 close together, one when the arm of switch 73 passes over contact 38 and the second one when it passes over contact 40. If the lamp does not light at all or if there is only one flash of the lamp the two rotary switches are not in perfect synchronism.

When master switch key 116 is pressed, a stepping circuit for magnet 72 is closed to ground over its own break contact and switches 73 and 81 (which may in practice comprise two switch arcs on the same switch) are stepped around very rapidly to the No. 1 or normal position. This may be done in case there is lack of synchronism so that switch 73 may be started out from its normal position in proper phase under control of rotary switch arc 4. Another reason for thus stepping this switch around is that in case some switch control keys have been pressed by a mistake the indication will not be sent if the master switch key is depressed because switch 73 will be stepped around to normal so rapidly that the setting of relays 141, 142, 143, etc. will not be changed until switch arc 140 rides on to terminal No. 1 when the relay 144 will be operated to restore relays 141, 142, 143, etc. to normal.

*Tube test*

At the repeater station each tube has a grid bias resistor 36, 36′, etc. in the plate circuit and the tube is tested by measuring the voltage drop across this resistor. This test can be made without interfering with the operation of the repeater since the test circuit draws very little current. The voltage drop across the grid bias resistor is a measure of the space current and this under given conditions of plate voltage supply gives a measurement of filament emission. Readings taken from time to time over a long period on the same tube are compared with one another and will show a tendency toward failure, lowering of efficiency, etc.

The measurement of the voltage drop across the grid bias resistor is accomplished by use of a Wheatstone bridge circuit shown in Fig. 2. In this figure the tube under test is shown schematically at 35 and the grid bias resistor at 36. The plate battery 42 is common to all of the tubes in the repeater station or at least to a number of them. The bridge comprises fixed arms 43′ and 44′, variable arm 45 and the grid bias resistor 36 of the particular tube under test. The resistance arm 43′ is mainly or wholly the internal plate resistance of the tube. The tube to be tested is selected by the switch 5, the arm of which moves from tube to tube in regular sequence. This is accomplished by merely shifting the galvanometer lead from tube to tube at the cathode point for it will be noted that the other bridge points are permanently connected to their respective terminals. The variable arm 45 is arranged to be automatically varied by the stepping of a rapidly moving rotary switch which comprises two brushes on the same shaft traveling over arcs 38 and 41, respectively. The galvanometer diagonal of the bridge includes a sensitive galvanometer relay 39. The starting of the fast moving pulsing switch arcs 38 and 41 is controlled by relay 40′ which during the testing cycle is connected to the brush arm of switch 5.

Assuming that switch 5 has its brush arm positioned on the terminal leading to the cathode of tube 35 an energizing circuit for relay 40′ is closed from battery 42, winding of relay 40′, galvanometer relay lead to the counting relays that have been actuated up to 18 and 19, brush arm of switch 5, bias resistor 36 to ground, so that this relay closes the starting lead for the pulsing switch magnet 150 for switching arcs 38 and 41 causing these switches to make a complete revolution under control of arc 151 and motor-driven interrupter 152. As the brush arm of switch 38 moves over contacts of the variable resistance 45, the resistance of the variable arm of the bridge is varied and the condition of balance or unbalance is therefore changed. Galvanometer relay 39 is polarized and is so biased that it will be operated when switch 38 is on its first wired contact due to the unbalance current. At one step past balance point the current reverses and releases relay 39. From then on no further pulses are sent to the test station. By this means a definite number of pulses will be sent out determined by the condition of unbalance of the bridge. These pulses when received at the test station in a manner to be described later on are translated into an indication of the voltage drop across the bias resistor 36 of the tube that is under test.

During the time of test of the tube 35 the brush arm of switch 5 has been constantly moving at a slow rate and after a complete rotation of switch arcs 38 and 41 brush arm of switch 5 moves off from the contact of tube 35 allowing relay 49' to release and prevent the switch arcs 38 and 41 from starting another rotation. As the brush arm of switch 5 subsequently engages the terminal corresponding to the next tube to be tested, (e. g., tube 35'), the same sequence of operations is carried through.

When these pulses are received at the test station they operate pulsing relay 51 which cooperates with slow relay 55 to count off a certain number of steps on the relay chain depending upon the number of impulses received. At the conclusion of the received series of impulses, one of the printer control relays 65, 66, etc. is actuated and causes a printer mechanism to print a character showing the number of impulses received, that is, the voltage across the bias resistor 36.

It will be noted that one impulse is always sent out even if the bridge balance point is such as not to release the relay by unbalance current. This one impulse is sent when switches 38 and 41 take their initial step by momentary closure of loop 194 directly by switch arm 41. This insures that the first printer control relay 65 will operate in case there are no further impulses and the printer registers that condition.

The galvanometer 39 is a polarized relay and will not break its contact for a direction of unbalance of the bridge such as to indicate current above a predetermined value. That is, the bridge measurements are intended to show a diminution of space current below a limiting value. The bridge circuit really asks: is the space current 10 mils, is it 9 mils, is it 8 mils, etc. At point of balance, the galvanometer relay says "yes" by opening the pulsing loop.

The procedure in making a tube test is to measure the space current, then to reduce the filament heating current and automatically repeat the space current measurement. The two space current readings under the different cathode heating current conditions give an index of the emissivity of the cathode. In testing a large number of tubes by the system of the invention, the tubes are all measured for space current at normal cathode temperature. Then the cathode heating current is reduced on all of the tubes automatically as by actuating the switch control sectors 4 and 140 to insert resistance 170 into the cathode-heating circuit of all of the tubes by operation of relay 143 as above described. This may be done by withdrawing the double plug from the jacks at the test station, allowing the apparatus at the repeater station to release and thereafter inserting the plug and carrying through the cycle of operations that have already been described. During the switching cycle the resistance 170 is inserted into the cathode-heating circuit.

The printer mechanism may be of any well known or suitable type such as a page printer operating on, say, a five-impulse code. Each relay such as 65, 66, 67, etc. has its armatures variously connected to energize a different series of the five code relays (not shown) in the printer. One example of a suitable printer employing a five-impulse code is U. S. patent to Dixon 1,103,133, July 13, 1914.

What is claimed is:

1. In a signal transmission system, a repeater station including a plurality of space discharge repeaters for repeating signals, a measuring test apparatus at said station common to said repeaters for making test measurements on the circuits of said repeaters while said repeaters are functioning normally to repeat signals, means to translate the measurements so made into currents suitable for actuating quantitatively and proportionally a recorder and a recorder actuated by said currents.

2. In a transmission system, a repeater station, comprising a plurality of space discharge repeaters having cathodes, test apparatus at said repeater station common to said repeaters, means controlling said test apparatus causing it to test said repeaters in rotation at one value of cathode-heating current, means associated with said test apparatus to change the cathode-heating current of said repeaters to a new value, means causing said test apparatus to test said repeaters in rotation at said new value of cathode-heating current, and a recorder for making a record of said testing operations.

3. In a signaling system, a line, a test station and a repeater station on said line remotely separated from each other, space discharge tube repeaters at said repeater station, each tube having a cathode and anode and a source of cathode-heating current, means at said repeater station controlled from said test station for automatically testing said tubes in rotation, means for thereafter changing the cathode-heating current to a new value and again automatically testing said tubes in rotation under control of said test station, and means at said test station controlled from said repeater station for indicating the test condition of each of said tubes for said different cathode-heating current values.

4. An electrical instrument in which an internal circuit condition is progressively changed from a normal initial condition to effect a balance with a variable external circuit condition, response means operated to control the balancing of said condition, means to produce a series of pulses corresponding to the number of steps through which said internal circuit condition is changed before said balanced condition is reached, a circuit for transmitting said series of impulses to an indicating point, means at the indicating point for translating said series of impulses into a permutation code, and a printer mechanism selectively operated under the control of said last mentioned means to print a corresponding record.

5. In an electrical measuring system, a circuit including a response element, means to impress on said circuit a voltage tending to cause actuation of said response element, means for changing the electrical condition of said circuit progressively in steps in a sense to oppose the effect of said voltage on said response element, means to transmit to an indicating point a succession of impulses corresponding to the number of steps through which said condition is progressively changed, a printing mechanism at said indicating point, a multiplicity of control circuits for said printing mechanism each corresponding to a particular printed indication, and means for energizing said control circuits selectively in accordance with the number of impulses so transmitted.

6. In an electrical measuring system, a circuit including a response element, means to impress on said circuit a voltage causing actuation of said response element, means controlled from said response element for changing the electrical condition of said circuit in steps progressively in a direction to oppose response of said element to said voltage until the response element is restored to non-responsive condition, said last means causing the production of impulses corresponding to the number of steps through which the electrical condition of the circuit is changed, and a printer mechanism operated under the control of said impulses to print a record in accordance with the number of said impulses.

CHARLES R. MEISSNER.